April 5, 1932.  O. W. SCHAUM  1,852,092

ROLL

Filed May 29, 1931

INVENTOR.
Otto W. Schaum
BY
Kiddle, Margeson and Hornidge
ATTORNEYS.

Patented Apr. 5, 1932

1,852,092

UNITED STATES PATENT OFFICE

OTTO W. SCHAUM, OF PHILADELPHIA, PENNSYLVANIA, ASSIGNOR TO FLETCHER WORKS, INCORPORATED, OF PHILADELPHIA, PENNSYLVANIA, A CORPORATION OF PENNSYLVANIA

ROLL

Application filed May 29, 1931. Serial No. 540,953.

My invention relates to improvements in rolls for use in connection with twisters, looms, etc., being particularly directed to take-up rolls for twisters, these rolls which are covered with cork or leather being employed for the purpose of determining the gathering speed of the thread.

One of the objects of my invention is to provide a roll comparatively light in weight, resulting in a direct saving in power, and a roll which can be held more securely on the shaft than rolls as heretofore constructed.

A further object of my invention is the provision of a roll so constructed that the leather or cork covering can be readily applied thereto without any machining operation.

In the accompanying drawings

Figure 1:
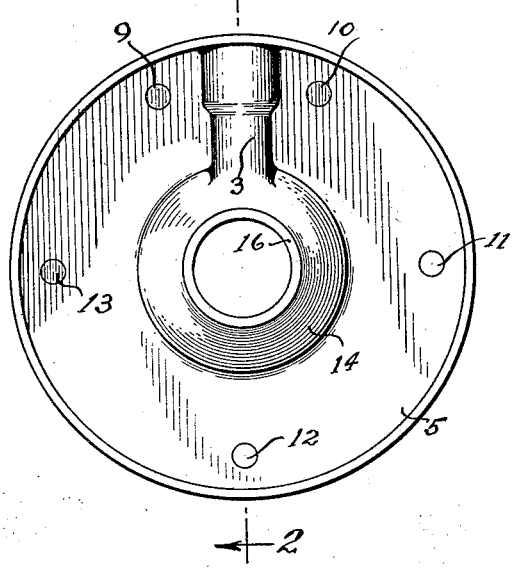
Fig. 1 is an end view of my improved roll.
Figure 2:
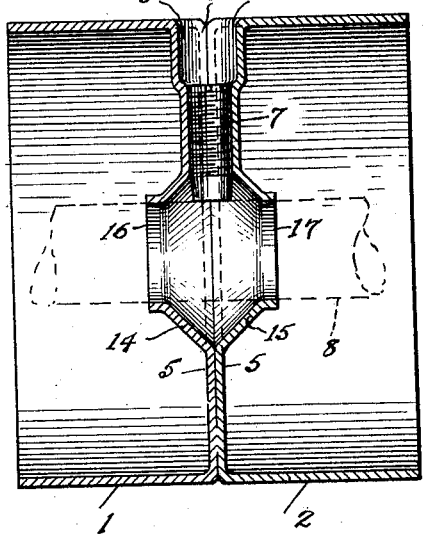
Fig. 2 is a section on line 2—2 of Fig. 1.
Figure 3:
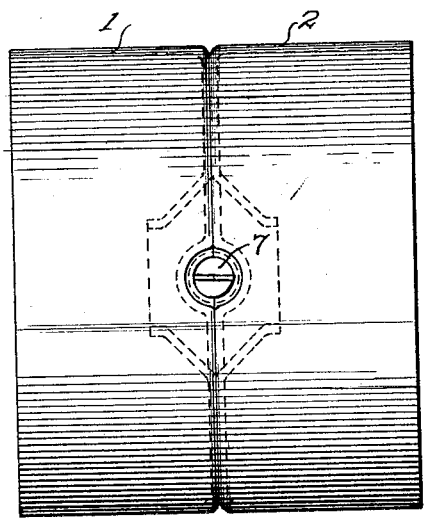
Fig. 3 is an elevational view.

Referring to the drawings in detail, 1 and 2 designate two halves of my improved roll, these halves, which are identical, each being provided with a groove or half cylinder designated 3 and 4 respectively. The roll is of pressed steel and these grooves are pressed into the web 5 of each half of the roll when the roll is being formed to provide a cylinder 6 perpendicular to the axis of the roll when the two halves are secured together. This cylinder is later tapped for receiving a set screw 7 whereby the roll may be securely fastened to the shaft 8 on which the roll is to be mounted.

As above noted the two halves 1 and 2 of the roll are stamped from pressed steel, and may be secured to each other in any suitable manner, as by spot welding as indicated at 9, 10, 11, 12 and 13. When the two halves of the roll are secured together the grooves or half cylinders 3 and 4 will be in register whereby the tapping of the cylinder can be readily accomplished.

Each web 5 of the roll halves 1 and 2 is provided with hollow conical hubs 14 and 15, respectively, to provide a construction in which only the annular flanges 16 and 17 of the hubs engage the shaft 8 on which the roll is mounted so that the shaft is engaged at equidistant points from the center of the roll whereby when the set screw 7 is inserted the same will press against the shaft midway between these two points of contact resulting in a three-point contact. This is of considerable advantage over former rolls wherein the shaft is engaged by the roll for the full length of the hole in the roll and the set screw presses the shaft against the hub with maximum pressure at a point directly opposite the set screw giving a two-point contact with the ever constant danger of the roll working loose and slipping on the shaft.

While I have illustrated and described a preferred embodiment of my invention it is to be understood that various changes and modifications may be made therein without departing from the spirit and scope of my invention.

What I claim is:—

1. A sheet metal take-up roll for twisters comprising two stampings each of which provides one half of the roll and one half of a hole for a set screw, and means for securing the two stampings together.

2. A sheet metal take-up roll for twisters comprising two stampings each stamping comprising one half of the roll and having a groove therein extending perpendicular to the axis of the roll, and providing one half of a hole for a set screw, each stamping being provided centrally with a conical hub formation providing one half of the roll hub, and means for securing the two stampings together.

3. A sheet metal take-up roll for twisters comprising two identical halves, each half being shaped to provide one half of a hole for a set screw extending perpendicular to the axis of the roll, said halves being spot welded to each other.

4. A sheet metal take-up roll for twisters comprising two identical halves shaped to provide a hole for a set screw perpendicular to the axis of the roll and to provide a hub for receiving a shaft on which the roll is mounted, said halves being spot welded to each other, said hub being so shaped as to contact with the shaft only at points spaced equidistant from the center of said roll.

5. A take-up roll for twisters comprising two pressed steel parts each comprising a cylindrical outer portion, a flat web portion, a conical hub portion and a cylindrical portion perpendicular to the axis of the roll and means for securing the two parts together.

6. A take-up roll for twisters comprising two sheet metal parts each comprising a cylindrical outer portion and an end portion, each of said end portions having a groove to provide a hole perpendicular to the axis of the roll, said end portions each being provided centrally with a conical hub portion having an annular flange thereon, a shaft passing through the said hub portions and engaging the same at said annular flanges only, and a set screw in said hole engaging said shaft intermediate the points of engagement of the shaft with said annular flanges.

This specification signed this 27th day of May, 1931.

OTTO W. SCHAUM.